Patented Apr. 14, 1925.

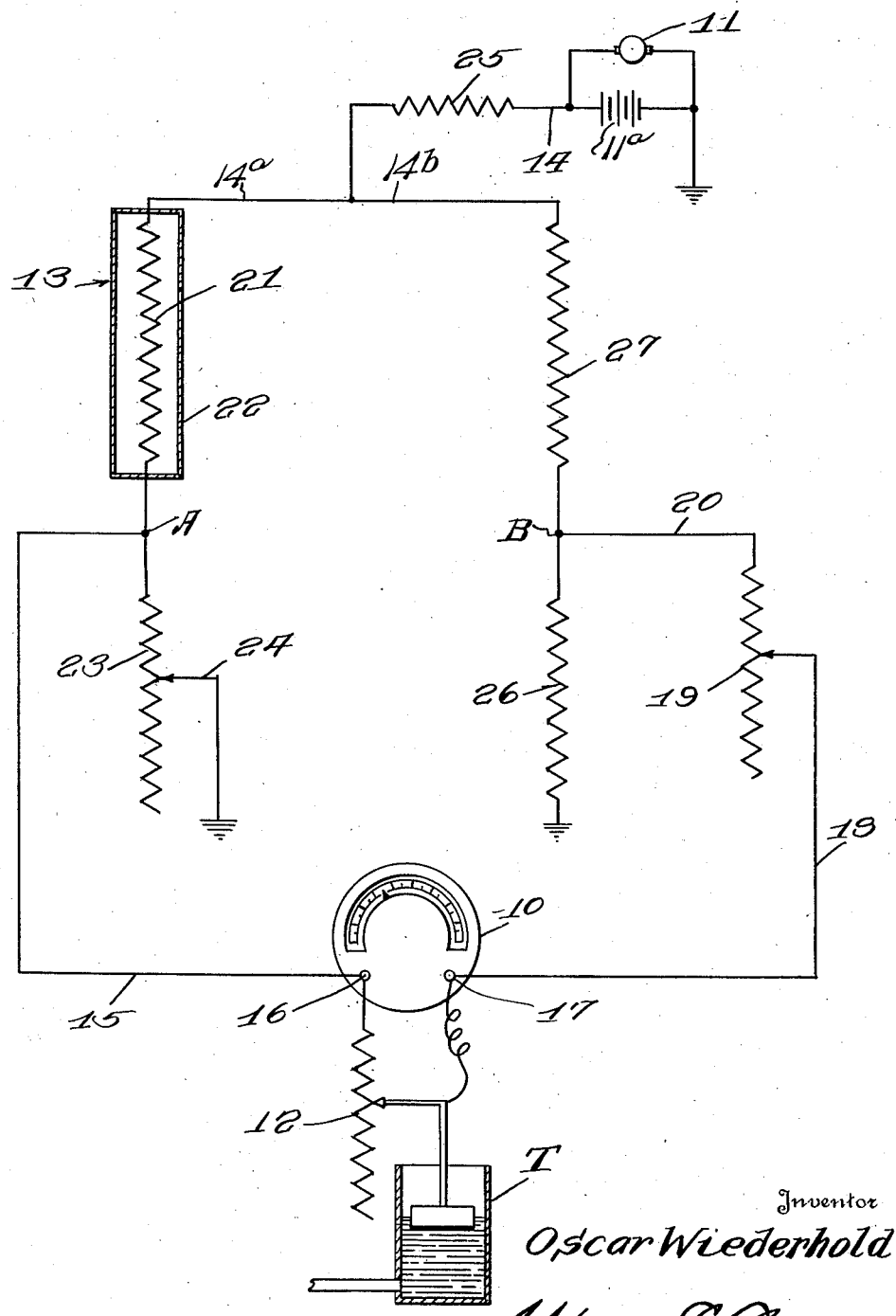

1,533,680

UNITED STATES PATENT OFFICE.

OSCAR WIEDERHOLD, OF PHILADELPHIA, PENNSYLVANIA.

ELECTRICALLY-ACTUATED GAUGE.

Application filed February 21, 1923. Serial No. 620,543.

*To all whom it may concern:*

Be it known that I, OSCAR WIEDERHOLD, a citizen of the United States, residing at Philadelphia, in the county of Philadelphia and State of Pennsylvania, have invented certain new and useful Improvements in Electrically-Actuated Gauges, of which the following is a specification, reference being had to the accompanying drawings.

This invention relates to electrically actuated gauges, and more particularly to a fluid level gauge.

An important object of the invention is to provide means for maintaining in a circuit for an electrically actuated gauge a substantially constant voltage.

It is well known to those familiar with the electrical systems of automobiles, that the current delivered from the generator varies in accordance with the speed of the vehicle. In the ordinary six-volt generator the current delivered at low or idling speed of the engine will be approximately five volts, whereas at high speed approximately eight volts are delivered. It will be further obvious that this variation in voltage will render it extremely difficult to obtain an accurate reading from an electrically actuated gauge operated from such a source, necessitating the provision of means for maintaining a constant voltage in that portion of the meter circuit in which the meter is disposed.

A further object of the invention is to provide a circuit of this character wherein the control means is variable to compensate for errors of the voltage control element.

A still further object of the invention is to provide means whereby the reading of a gauge controlled by a float operated rheostat may be corrected without the necessity of adjusting the resistance of the rheostat for such correction.

These and other objects I attain by the structure shown in the accompanying drawings, wherein for the purpose of illustration I have shown a preferred embodiment of my invention and wherein like reference characters designate like parts throughout.

In the drawings the figure shows a wiring diagram illustrating one manner of employing my invention with the gauge.

Referring now more particularly to the drawings, the numeral 11 designates the usual generator and 11$^a$ the battery of the ignition system of an automobile. As is usual, one terminal of the generator and battery are grounded, as indicated at G. The other terminals of the battery and generator are connected by a common wire 14 to wires 14$^a$ and 14$^b$, the common wire 14 preferably having arranged therein a resistance 25 to reduce the amount of current flowing therethrough.

The wire 14$^a$ has arranged therein a main resistance 13 and a secondary resistance 23, the resistance 13 preferably being a wire 21 having a positive temperature coefficient resistance disposed within an evacuated container 22. The resistance 23 is preferably variable, one terminal thereof being connected to wire 14$^a$ and the other terminal thereof being connected to the ground through wire 24. The wire 14$^b$ connects with the ground and has arranged therein a main resistance 27 and a secondary resistance 26. The main resistances 13 and 27 are in each instance arranged next adjacent the connection of their respective wires 14$^a$ or 14$^b$ with the wire 14.

It will be obvious that if the resistances 13 and 27 are made of different values the drop across the two resistances will be unequal and accordingly a circuit connected at A to the wire 14$^a$, between the resistances 13 and 23, and at the other wire 14$^b$, between the resistances 27 and 26 as at B, will have a current flowing therethrough equal to the difference in drop in pressure between the two resistances. Ignoring the resistance 25 and assuming the resistance 13 to represent a drop of four volts and the resistance 27 to represent a drop of five volts, if six volts pressure is applied through the wire 14 to the wires 14$^a$ and 14$^b$ the difference in pressure will be one volt which will be present in the circuit AB.

Were the resistances 13 and 27 both fixed and the six volts above mentioned doubled, the drop across the resistance 13 would be eight volts and that across the resistance 27 would be ten volts, with the result that two volts pressure would be present in the circuit AB. However, the wire 21 of the resistance variator 13 due to its positive temperature coefficient resistance will upon an increase in voltage increase its resistance so as to substantially equalize the drop across these points giving instead of an eight volt drop upon such voltage increase a nine volt drop with such a small error that the same may be disregarded so that the pressure across the circuit AB will remain substantially constant at all times and for practical purposes may be regarded as constant.

The circuit AB has in series therein a float operated rheostat 12, the float of which is operated by the height of liquid in the fluid tank T of the vehicle. Across the terminals of this float operated rheostat by wires 15 and 18 are connected the terminals of a gauge 10 preferably in the form of a milli-ammeter graduated in units of liquid measure. The wire 15 connects to the point A and the wire 18 preferably connects to one terminal of a variable resistance 19, the second terminal of which is connected to the point B by wire 20.

It will be seen that the resistance 13 is in effect a variator for determining the pressure of the current flowing through the circuit AB. It has been found by test that such variators will provide a substantially constant voltage for the gauge circuit AB but that this voltage as delivered to the gauge will cause a certain amount of error in the actual reading of the gauge due to the fact that the greater increase of the temperature of the resistance element the greater the choking effect of the resistance. Accordingly a resistance element which would give the correct reading at a low or minimum voltage would give an incorrect temperature at a high or maximum voltage. It is for this reason that the resistance 23 in series with the resistance 13 is made variable. By adjustment of the variable contact of the resistance a point may finally be arrived at in which the error of reading due to the inaccuracy of the limiting effect of the resistance 13 is reduced to a minimum and to a point where it is hardly noticeable upon a milli-ammeter gauge. This is due to the fact that the resistance 13 exerts its maximum effect as regards its ability to vary the total resistance of the circuit when it exists by itself and the addition of the series resistance, as the resistance 23, naturally reduces the resistance of the variator 13 in proportion to the value of such resistance 23.

Assuming the variable contact of the resistance 23 to be arranged at a given point and that a given voltage increase will cause a stated decrease in the delivered voltage in that portion of the circuit including the meter, then a decrease of the resistance 23 will result in the delivered voltage being decreased and an increase of the resistance 23 will result in an increase in the delivered voltage upon an increase of the voltage applied to the resistance 13 through the wires 14 and 14ᵃ. It will thus be seen that by proper adjustment of the resistance 23 a point can be found where any decrease or increase of voltage has no effect upon the reading of the meter at the extreme of voltage represented by the output of the generator 11, while the intermediate voltages will be slightly inaccurate the extent of this inaccuracy depending upon the extremes of voltage at which the resistance 23 has been set. This inaccuracy will be negligible in systems where the extremes of voltage are so closely related as is found in automobile generators. While I have above referred to an increase from six to twelve volts it will be obvious that such an increase does not occur in automobile ignition circuit generators, the limits being for a six-volt generator a variation between five and eight volts under any ordinary circumstances. It will be noted from an inspection of the drawings that the complete circuit disclosed is in effect a Wheatstone bridge the legs of which are represented by the resistances 13 and 27 and 23 and 26, the gauge circuit AB being the shunt across the legs.

I do not wish to be understood as limiting myself to any specific form of the variator 13 as I have found that the same may assume many forms. It will furthermore be obvious that the specific arrangement of the float operated rheostat and gauge is immaterial, it merely being necessary that these elements of the circuit be so located in the circuit that they are subjected to a voltage rectified and rendered constant by the resistance 13. I accordingly do not limit myself to the specific arrangement hereinbefore set forth except as hereinafter claimed.

I claim:—

1. Means for determining the contents of the fluid fuel containers of vehicles including a variable source of electro-motive force, a circuit including the source having parallel branches, each branch containing a main resistance and a secondary resistance, an electrically operated gauge, a connection between each of the branches of said circuit and a terminal of said gauge connected with each branch intermediate the resistances thereof, and a float operated rheostat shunting said gauge and connecting the terminals thereof, said main resistances being of different values, one of said main resistances consisting of a wire having a temperature coefficient of resistance maintaining a substantially constant voltage in the connection between said branches.

2. Means for determining the contents of the fluid fuel containers of vehicles including a variable source of electro-motive force, a circuit including the source having parallel branches, each branch containing a main resistance and a secondary resistance, an electrically operated gauge, a connection between each of the branches of said circuit and a terminal of said guage connected with each branch intermediate the resistances thereof, and a float operated rheostat shunting said gauge and connecting the terminals thereof, said main resistances being of different values, one of said main resistances consisting of a wire having a temperature coefficient of resistance maintaining a substantially constant voltage in the connection between said branches, the secondary resistance in series with the last named main resistance being variable.

3. Means for determining the contents of the fluid fuel containers of vehicles comprising a Wheatstone bridge receiving its energy from the generator and battery of the vehicle, the resistance of one of the legs of the bridge comprising a resistance having a positive temperature coefficient for maintaining a substantially constant potential across the connection between the legs at each side of the bridge, a connection between the legs at each side of the bridge including a float operated rheostat the float of which is disposed in the fuel container of the vehicle, and a gauge shunted across the float operated rheostat.

In testimony whereof I hereunto affix my signature.

OSCAR WIEDERHOLD.